(12) United States Patent
Murakami

(10) Patent No.: US 6,181,098 B1
(45) Date of Patent: Jan. 30, 2001

(54) DC MOTOR CONTROL CIRCUIT

(75) Inventor: Atsushi Murakami, Nagoya (JP)

(73) Assignee: Brother Kogyo Kabushiki Kaisha, Nagoya (JP)

(*) Notice: Under 35 U.S.C. 154(b), the term of this patent shall be extended for 0 days.

(21) Appl. No.: 09/315,839

(22) Filed: May 21, 1999

(30) Foreign Application Priority Data

May 21, 1998 (JP) .................................. 10-139427

(51) Int. Cl.[7] .................................. G05B 19/29
(52) U.S. Cl. .................. 318/603; 318/519; 318/568.1
(58) Field of Search .................. 318/569, 600, 318/601, 603, 567, 568.1; 364/174, 569; 101/483, 484, 211; 346/134, 150.3; 347/19

(56) References Cited

U.S. PATENT DOCUMENTS

| | | | |
|---|---|---|---|
| 3,889,169 | * 6/1975 | Hirschman et al. | 318/571 |
| 3,950,685 | * 4/1976 | Kramer | 318/561 |
| 4,054,820 | * 10/1977 | Foster | 318/341 |
| 4,143,310 | * 3/1979 | Fujinawa et al. | 318/571 |
| 4,169,991 | * 10/1979 | Ross | 318/599 |
| 4,216,415 | * 8/1980 | Shimonou et al. | 318/600 |
| 4,226,546 | * 10/1980 | Hoffman | 400/144.2 |
| 4,259,626 | * 3/1981 | Nomura et al. | 318/599 |
| 4,691,101 | 9/1987 | Leonard | 250/231 |
| 4,775,945 | * 10/1988 | Cavill et al. | 364/519 |
| 4,881,021 | * 11/1989 | Hirai | 318/569 |
| 5,124,625 | * 6/1992 | Wakabayashi | 318/603 |
| 5,416,395 | * 5/1995 | Hiramatsu et al. | 318/600 |
| 5,485,070 | * 1/1996 | Tominaga | 318/696 |

FOREIGN PATENT DOCUMENTS

| | | |
|---|---|---|
| 54-24088 | 8/1979 | (JP) . |
| 61-85086 | 4/1986 | (JP) . |

* cited by examiner

Primary Examiner—Robert E. Nappi
Assistant Examiner—Rita Leykin
(74) Attorney, Agent, or Firm—Oliff & Berridge, PLC

(57) ABSTRACT

A stop control circuit is configured from a hardware circuit that operates independently from a CPU. When a comparison circuit outputs a matching signal, then the stop control circuit starts processes for stopping a DC motor, regardless of the processing condition of the CPU. Accordingly, operations for stopping the DC motor can be executed at a stable timing so that the DC motor can be stopped at fixed positions. A stop detection circuit detects whether the print head has made an unscheduled stop for some reason or the other, and outputs an interrupt request signal to the CPU, when an amount that the print head is controlled to move has exceeded 20 H even though the actual amount that the print head has moved is still less than 5 H. Accordingly, the CPU need perform predetermined processes for the unscheduled stops only upon receiving the interrupt request from the stop detection circuit. Therefore, there is no need for the CPU to constantly check whether or not the print head has made an abnormal stop. Accordingly, burden on the CPU is greatly reduced so that the processing capability of the CPU is enhanced.

7 Claims, 9 Drawing Sheets

FIG.10

|  | FORWARD ROTATION SIGNAL 42a | REVERSE ROTATION SIGNAL 42b | BRAKE SIGNAL 43 | OUTPUT SIGNAL WHEN SWITCHING SIGNAL 44 |
|---|---|---|---|---|
| TR1 | ON | OFF | OFF | OFF |
| TR2 | OFF | ON | OFF | OFF |
| TR3 | OFF | ON | ON | OFF |
| TR4 | ON | OFF | ON | OFF |

DC MOTOR CONTROL CIRCUIT

BACKGROUND OF THE INVENTION

1. Field of the Invention

The present invention relates to a DC motor control circuit mounted in a serial printer and the like.

2. Description of the Related Art

There has been known a serial printer, in which a print head is driven by a DC motor for reciprocal movement during printing. Generally, the DC motor is controlled by a CPU provided in the printer. More specifically, positional information of the print head is obtained using a linear encoder or the like. The positional information is then supplied to the CPU so that the CPU can properly control the DC motor.

SUMMARY OF THE INVENTION

In a conceivable printer, the CPU determines the direction, in which the print head is desired to be moved, and the speed, at which the print head is desired to be moved. The CPU then performs control operation to move the print head in the desired direction and at the desired speed through executing interrupt processes described below.

That is, the linear encoder provided in the printer detects a movement of the print head, and outputs position detection signals. Every time the linear encoder issues a position detection signal, the position detection signal is supplied as an interrupt request signal to the CPU, whereupon the CPU executes an interrupt process to perform various processings. That is, during the interrupt process, the CPU determines the direction in which the print head is actually moving. The CPU increments or decrements its internal counter based on the determined direction, thereby producing a position count value indicative of the present position of the print head. The CPU controls start/stop operation of a timer to measure the period of time between the successively-executed interrupt processes. This measured period of time represents a speed, at which the print head is moving. The CPU compares the measured speed with the desired speed to be attained. Based on the compared result, the CPU increases or decreases the amount of an electric current flowing through the DC motor, thereby controlling the print head to move stably at the desired speed. The CPU also judges whether the print head reaches a predetermined stop position. When the CPU determines that the print head reaches the predetermined stop position, the CPU performs a braking operation to immediately stop the print head at the predetermined stop position. That is, the CPU stops the DC motor by outputting a stop signal to the DC motor. The CPU further judges whether or not the print head has stopped by investigating the state how the position count value changes. When the CPU determines that the print head has stopped properly at the predetermined stop position, the CPU then controls the DC motor to drive in an opposite rotational direction, thereby moving the print head to move in the opposite direction. The CPU can also determine that the print head has stopped for some trouble when the position count value does not change in conformity to the desired direction, in which the CPU has controlled the print head to move. When the CPU determines that the print head has stopped for some trouble, the CPU performs a predetermined error process.

While controlling movement of the print head as described above, the CPU also controls printing operation of the print head.

It is noted that the CPU performs the above-described control operations by executing a software program. In order to enhance the processing capability of the CPU, it is conceivable to provide a hardware circuit structure, shown in FIG. 1, that supplements or assists the above-described control operation of the CPU.

The hardware circuit structure of FIG. 1 is provided to obtain the position count value (positional information) of the print head by determining the direction, in which the print head is presently moving. The hardware circuit structure of FIG. 1 includes a position detection signal processing circuit 101 and a position count processing circuit 104. The position detection signal processing circuit 101 is connected to the linear encoder (not shown in the drawings). The linear encoder detects the movement of the print head, and outputs two position detection signals A and B, accordingly. The position detection signal processing circuit 101 receives the position detection signals A and B, and converts the signals A and B into a position count signal 102 and a direction distinction signal 103 in a manner shown in FIG. 2.

That is, when the position detection signal A rises while the position detection signal B is in a high condition, then the position detection signal processing circuit 101 outputs one pulse of the position count signal 102, and simultaneously inverts the direction distinction signal 103 to a high condition. On the other hand, when the position detection signal A falls while the position detection signal B is in a high condition, the position detection signal processing circuit 101 outputs one pulse of the position count signal 102, and simultaneously inverts the direction distinction signal 103 to a low condition.

The position count processing circuit 104 is for receiving the position count signal 102 and the direction distinction signal 103, and for outputting a position count value 105 depending on the position count signal 102 and the direction distinction signal 103. More specifically, when the position count signal 102 is inputted while the direction distinction signal 103 is in a high condition, the position count processing circuit 104 increments its internal counter value by one. On the other hand, when the position count signal 102 is inputted while the direction distinction signal 103 is in a low condition, the position count processing circuit 104 decrements the internal counter value by one. By referring to the internal counter value, the position count processing circuit 104 outputs a position count value 105 indicative of the print head movement position. It is noted that in this example of FIG. 2, an initial value of the internal counter of the position count processing circuit 104 is set to "100".

In this case, the CPU (not shown) controls movement of the print head based on the position count value 105. For example, when the position count value 105 reaches the predetermined value while the DC motor is being driven, the position count processing circuit 104 outputs an interrupt request signal to the CPU. As a result, the CPU performs an interrupt process for performing stopping processes to stop the DC motor by outputting a stop signal to the DC motor. When the DC motor is properly stopped, the CPU then controls the DC motor to drive in an opposite rotational direction. The CPU controls the print head to perform printing while moving the print head in the opposite direction.

Additionally, each time the position count signal 102 is outputted from the position detection signal processing circuit 101, the position count processing circuit 104 controls the CPU to execute another interrupt process. Each time the CPU performs the interrupt routine, the CPU confirms whether the position count value 105 has increased or decreased, so as to judge whether the print head has stopped due to some trouble. When the CPU judges that the print head has stopped for some unscheduled reason, the CPU performs the predetermined error process.

However, even though the above-described hardware circuitry of FIG. 1 is used, the DC motor is controlled to be stopped according to the interrupt routine performed by the CPU. A timing, at which the interrupt routine is executed, changes depending on other processes the CPU is performing. Accordingly, the processes for stopping the DC motor can not be performed at a uniform timing. As a result, the print head can not stop at the desired fixed stop position.

In addition, in order to detect whether the print head has stopped due to some trouble, the CPU has to perform the interrupt routine each time the position detection signal processing circuit 101 outputs the position count signal 102. Therefore, the CPU has to execute the interrupt routine still frequently. The processing capability of the CPU is not enhanced.

It is therefore an objective of the present invention to overcome the above-described problems and to provide an improved DC motor control circuit that is constructed from a hardware circuit to supplement or assist the software control operations by the CPU and that is capable of stopping the DC motor at a fixed position, while increasing the processing capability of the CPU by reducing the number of interrupt routines required to be executed by the CPU.

In order to attain the above and other objects, the present invention provides a DC motor control circuit for controlling a DC motor, comprising: a rotational signal output circuit detecting a rotation of a DC motor, that is controlled by a control unit to attain a relative movement between a print head and a recording medium, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a position output circuit receiving the operational signal and outputting a positional value indicative of the relative position between the print head and the recording medium; a comparing circuit comparing the positional value with a first predetermined value, and outputting a matching signal when the positional value is matched with a first predetermined value; and a switch circuit receiving the matching signal, and switching from outputting of a drive signal for driving the DC motor to outputting of a stop signal for stopping the DC motor.

The DC motor control circuit may be mounted in a printer, which includes: the print head for printing images onto the recording medium; the DC motor for attaining the relative movement between the print head and the recording medium; and a control unit including a CPU for controlling the operation of the print head and the DC motor by executing a software program. The DC motor control circuit is a hardware circuit to be used for supplementing or assisting the control attained by the control unit.

When the positional value matches with the first predetermined value, the control signal to be outputted to the DC motor to control the driving state of the DC motor is switched by the switch circuit. Because the DC control circuit is constructed as a hardware circuit for supplementing or assisting the control performed by the control unit, the DC control circuit can switch from the DC motor driving signal to the DC motor stopping signal at a uniform timing, regardless of the processing condition of the CPU in the control unit.

The switch circuit may output the signal for stopping the DC motor when receiving the matching signal while the switch circuit is outputting the signal for driving the DC motor. It is therefore possible to perform the DC motor stopping control at a stable timing, and therefore possible to stop the DC motor at a stable stop position.

The DC motor control circuit may further comprise at least one switch for driving the DC motor, wherein the switch circuit outputs a signal to turn OFF all of the at least one switch before switching from the signal for driving the DC motor to the signal for stopping the DC motor. It is therefore possible to prevent the DC motor driving circuit from being short-circuited when switching between the DC motor driving signal and the DC motor stopping signal. It is possible to protect the DC motor driving circuit.

The DC motor control circuit may further comprise: a controlled movement amount count circuit counting a movement amount value, controlled to be attained onto the relative movement, based on the movement amount signal; an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal; a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

Thus, based on the movement amount signal, the controlled movement amount count circuit counts up the movement amount, by which the relative movement is controlled to be attained. Based on the movement amount signal, the actual movement amount count circuit counts up or counts down the actual movement amount, by which the relative movement is actually attained. More specifically, the actual movement amount count circuit receives the movement direction signal and the controlled direction signal. When the movement direction signal and the controlled direction signal indicate the same direction, the actual movement amount is counted up based on the movement amount signal. When the movement direction signal and the controlled direction signal indicate the opposite directions, the actual movement amount is counted down based on the movement amount signal.

When the value counted by the actual movement amount count circuit reaches the second predetermined value, the values counted by both the actual movement amount count circuit and the controlled movement amount count circuit are resetted. If the value counted by the actual movement amount count circuit does not reach the second predetermined value, the resetting operation is not performed. As a result, the value counted by the controlled movement amount count circuit will possibly reach the third predetermined value. As a result, the stopped condition signal output circuit outputs, to the control unit, the stopped condition signal indicating that the relative movement has been stopped. Thus, the control unit is notified that the relative movement has stopped for some trouble.

Thus, if the relative movement is stopped for some reason, the value (controlled movement amount) counted by the controlled movement amount count circuit will reach the third predetermined value greater than the second predetermined value, while the value (actual movement amount) counted by the actual movement amount count circuit repeatedly increases and decreases and does not reach the second predetermined value. Accordingly, the stopped condition signal output circuit outputs, to the control unit, the signal indicating that the relative movement has stopped for some reason. The DC motor control circuit is constructed from a hardware circuit for supplementing or assisting the control by the control unit. Accordingly, when the DC motor control circuit outputs, to the control unit, the signal indicating that the relative movement has stopped, the control unit can know that situation. It is possible to decrease the number of times when the CPU in the control unit has to execute interrupt processes. The operating ability of the CPU is enhanced.

The signal indicating that the relative movement has stopped may be outputted as an interrupt request signal to the control unit. It is sufficient that the CPU in the control unit execute an error process only when receiving the interrupt request signal from the stopped condition signal output circuit. Accordingly, it is unnecessary for the CPU to continuously monitor the state of the relative movement.

According to another aspect, the present invention provides a DC motor control circuit, comprising: a rotational signal output circuit detecting a rotation of a DC motor, that is controlled by a control unit to attain a relative movement between a print head and a recording medium, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a controlled movement amount count circuit counting a movement amount value, controlled to be attained onto the relative movement, based on the movement amount signal; an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal; a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

According to still another aspect, the present invention provides a DC motor control device for controlling a DC motor, comprising: a control unit controlling rotation of a DC motor to attain a relative movement between a print head and a recording medium; a rotational signal output circuit detecting the rotation of the DC motor, that is controlled by the control unit to attain the relative movement, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a position output circuit receiving the operational signal and outputting a positional value indicative of the relative position between the print head and the recording medium; a comparing circuit comparing the positional value with a first predetermined value, and outputting a matching signal when the positional value is matched with a first predetermined value; a switch circuit receiving the matching signal, and switching from outputting of a drive signal for driving the DC motor to outputting of a stop signal for stopping the DC motor; a controlled movement amount count circuit counting a movement amount value, controlled to be attained onto the relative movement, based on the movement amount signal; an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal; a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

According to a further aspect, the present invention provides a printer, comprising: a print head performing a printing operation onto a recording medium; a DC motor rotating to attain a relative movement between the print head and the recording medium; a control unit controlling the rotation of the DC motor; a rotational signal output circuit detecting the rotation of the DC motor, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a position output circuit receiving the operational signal and outputting a positional value indicative of the relative position between the print head and the recording medium; a comparing circuit comparing the positional value with a first predetermined value, and outputting a matching signal when the positional value is matched with a first predetermined value; and a switch circuit receiving the matching signal, and switching from outputting of a drive signal for driving the DC motor to outputting of a stop signal for stopping the DC motor.

According to another aspect, the present invention provides a printer, comprising: a print head performing a printing operation onto a recording medium; a DC motor rotating to attain a relative movement between the print head and the recording medium; a control unit controlling the rotation of the DC motor; a rotational signal output circuit detecting the rotation of the DC motor, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a controlled movement amount count circuit counting a movement amount value, controlled to be attained onto the relative movement, based on the movement amount signal; an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal; a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

According to a further aspect, the present invention provides a DC motor control circuit for controlling a DC motor, comprising: a rotational signal output circuit detecting a rotation of a DC motor, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a position output circuit receiving the operational signal and outputting a positional value indicative of the relative position between the print head and the recording medium; a comparing circuit comparing the positional value with a first predetermined value, and outputting a matching signal when the positional value is matched with a first predetermined value; and a switch circuit receiving the matching signal, and switching from outputting of a drive signal for driving the DC motor to outputting of a stop signal for stopping the DC motor.

According to another aspect, the present invention provides a DC motor control circuit, comprising: a rotational signal output circuit detecting a rotation of a DC motor, and outputting a rotation signal indicative of the detected rotation; an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium; a first movement amount count circuit counting a first movement amount value of the relative movement by simply incrementing the first movement amount value based on the movement amount signal; a second movement amount count circuit counting a second movement amount of the relative movement based on both of the movement amount signal and the movement direction signal; a reset circuit resetting the value counted by the first movement amount count circuit and the value counted by the second movement amount count circuit when the value counted by the second movement amount count circuit reaches a second predetermined value; and a stopped condition signal output circuit outputting a signal indicating that the relative movement is stopped, when the value counted by the first movement amount count circuit reaches a third predetermined value that is greater than the second predetermined value.

BRIEF DESCRIPTION OF THE DRAWINGS

The above and other objects, features and advantages of the invention will become more apparent from reading the following description of the preferred embodiment taken in connection with the accompanying drawings in which:

FIG. 10 is a chart showing on and off conditions of switches (transistors) in the DC motor drive circuit according to various states of a DC motor control signal.

DETAILED DESCRIPTION OF THE PREFERRED EMBODIMENT

Figure 1:
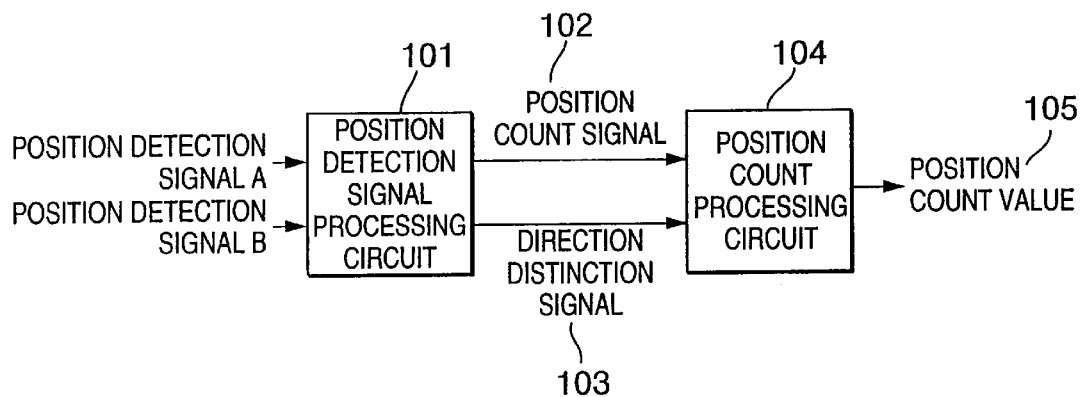
FIG. 1 is a block diagram showing a conceivable DC motor control circuit.

A DC motor control circuit according to a preferred embodiment of the present invention will be described while referring to the accompanying drawings wherein like parts and components are designated by the same reference numerals to avoid duplicating description.

Figure 3A:
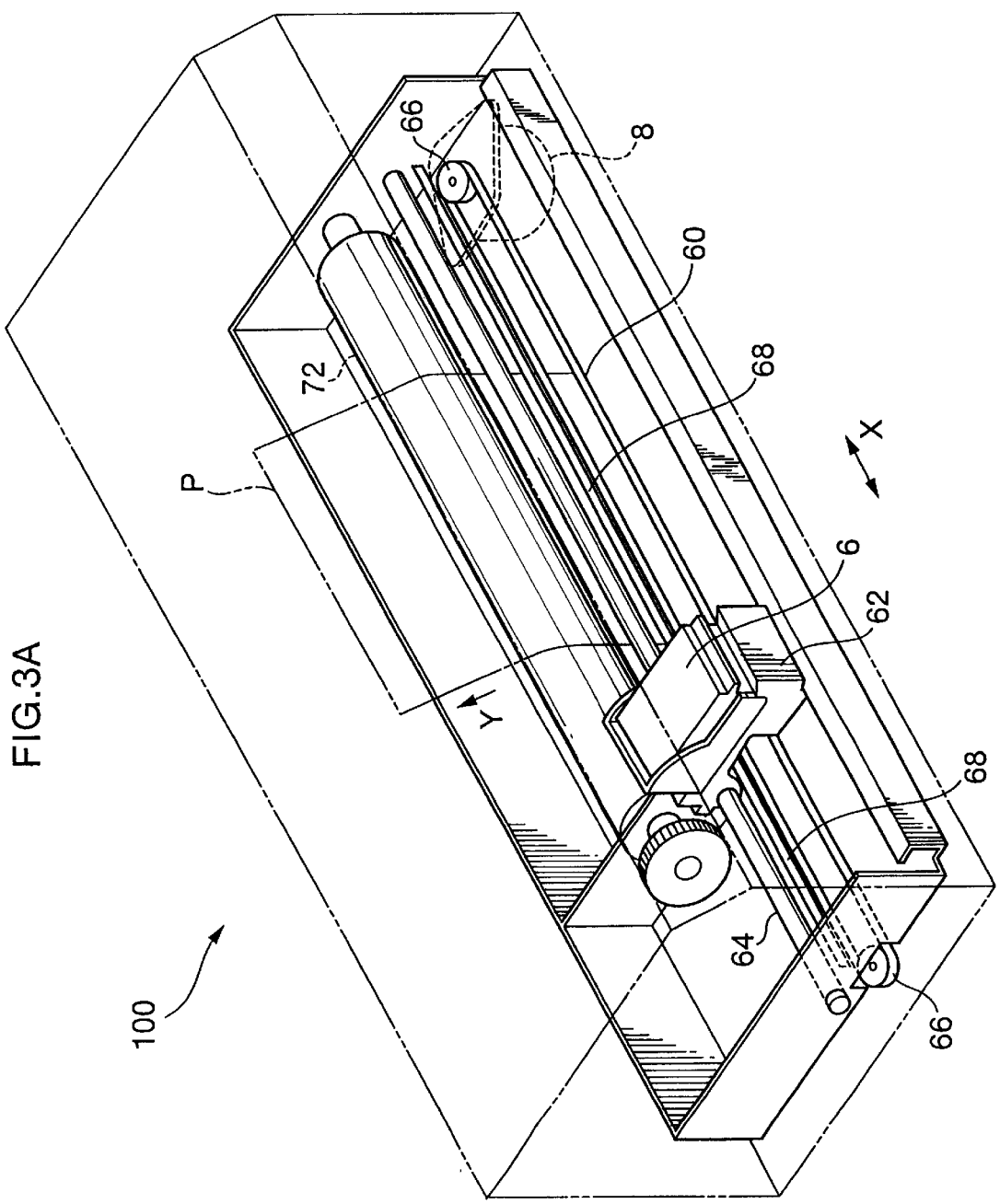
FIG. 3A shows an internal structure of a serial type ink jet printer, to which applied a DC motor control circuit according to an embodiment of the present invention.
Figure 3B:
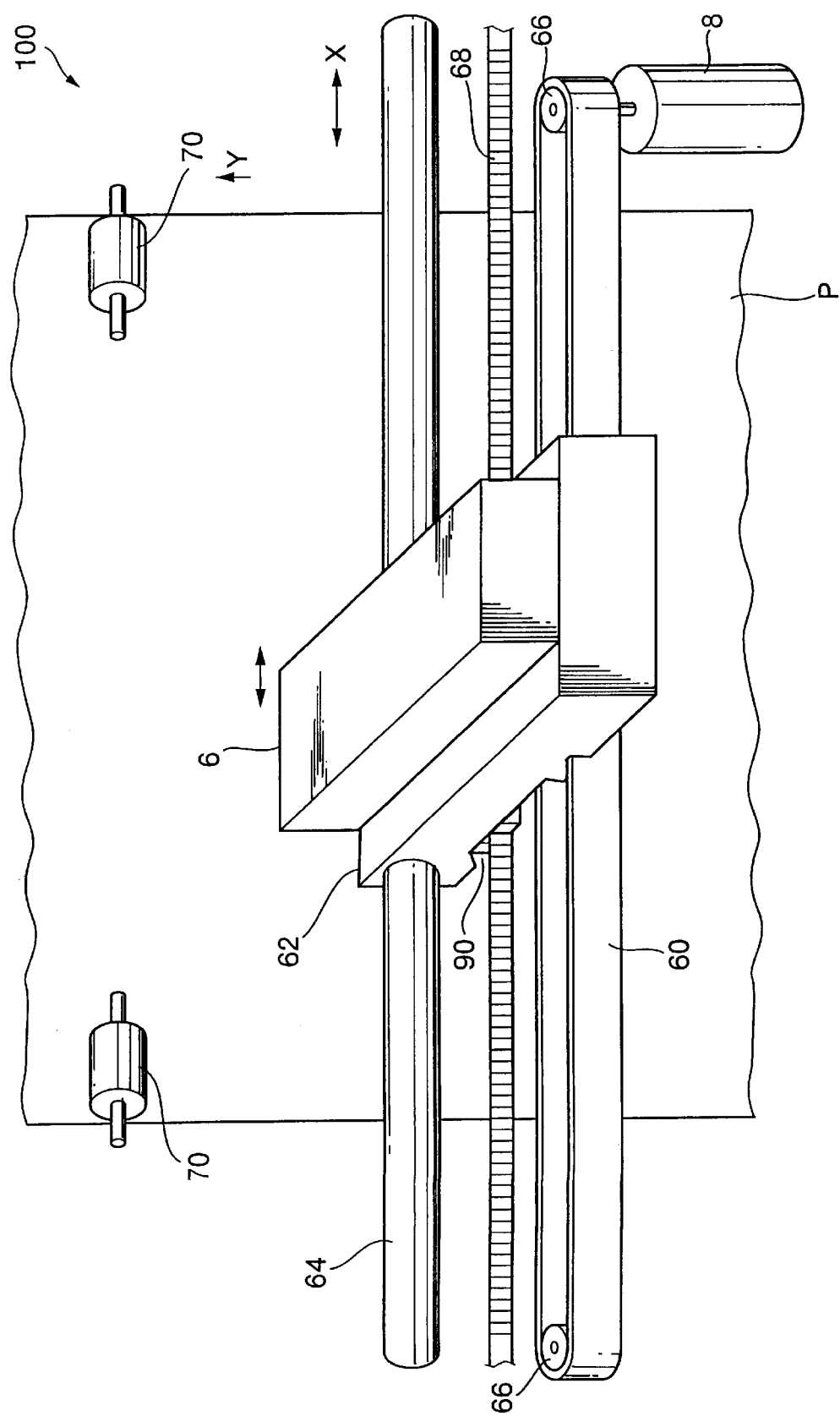
FIG. 3B shows an essential portion of the printer of FIG. 3A.

FIG. 3A shows an internal structure of a serial printing type ink jet printer 100, to which applied is the DC motor control circuit according to the embodiment of the present invention. FIG. 3B shows an essential part of the printer 100.

As shown in FIGS. 3A and 3B, a recording medium such as a sheet of paper P is transported by a platen 72 and a pair of sheet feed rollers 70 in an auxiliary scanning direction Y. A carriage motor (DC motor) 8 is provided to rotate one of a pair of pulleys 66. A timing belt 60 is wound around the pair of pulleys 66. A carriage 62 is fixedly attached to the timing belt 60. In accordance with the drive of the carriage motor 8, therefore, the carriage 62 reciprocally moves in a main scanning direction X as being guided by a guide rod 64, which is fixedly provided in the printer 100 to extend in the main scanning direction X. It is noted that the main scanning direction X is perpendicular to the auxiliary scanning direction Y. A print head 6 is mounted on the carriage 62.

With the above-described structure, when the DC motor 8 is driven to move the print head 6 reciprocally, the print head 6 performs an ink ejection operation onto the surface of the sheet P, thereby recording desired images on the sheet P.

A timing slit strip (linear scale) 68 is fixedly provided in the printer 100 also to extend in the main scanning direction X. The carriage 62 is mounted with a linear encoder sensor 90 for measuring the movement of the carriage 62, thereby measuring the rotation of the DC motor 8.

Figure 4:
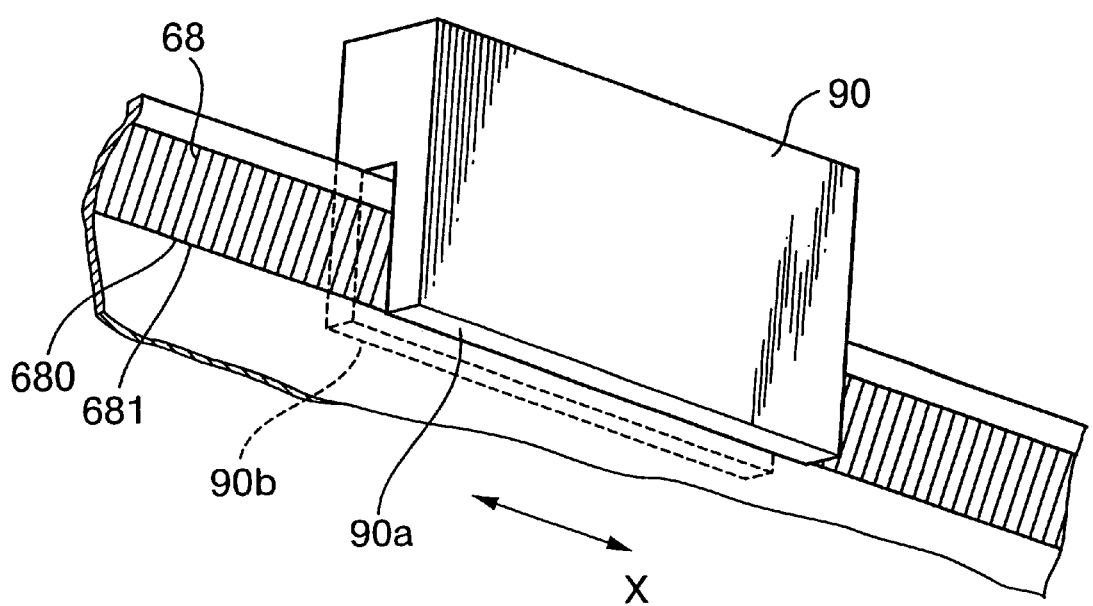
FIG. 4 shows the structure of the encoder sensor of FIG. 3B.

As shown in FIG. 4, the encoder sensor 90 has two portions: a light emitting side portion 90a that confronts one side of the timing slit strip 68; and a light receiving side portion 90b that confronts the other side of the timing slit strip 68. A light emitting diode (not shown) is located on the light emitting side 90a to emit a light beam to the timing slit strip 68. Four light detectors 92a–92d (FIG. 5) are located on the light receiving side 90b to receive the light beam that has passed through the timing slit strip 68.

Figure 5:
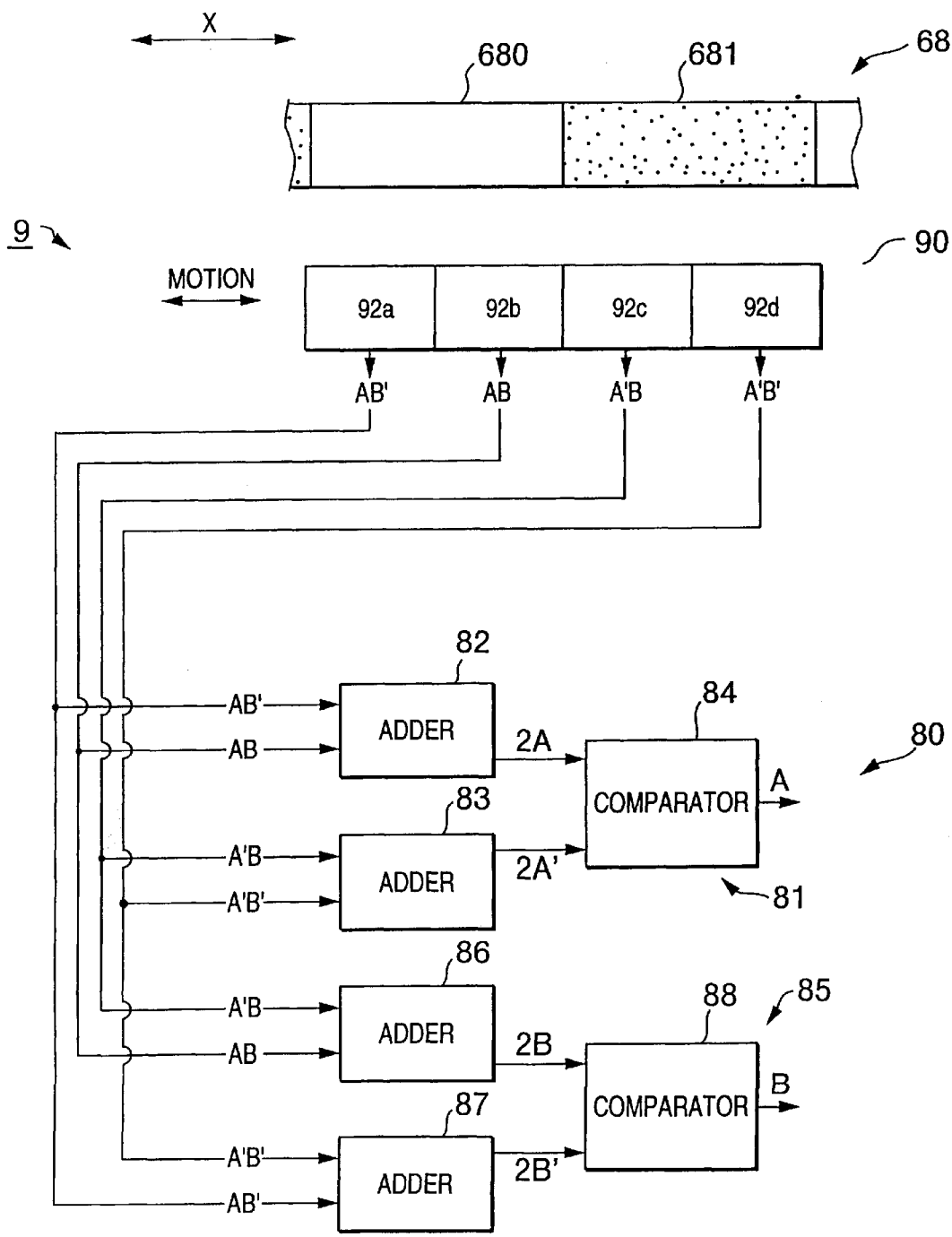
FIG. 5 shows the dimensional and positional relationship between a timing slit strip and light detectors in the encoder sensor, and shows a circuit structure of a position detection signal output circuit.
Figure 6:
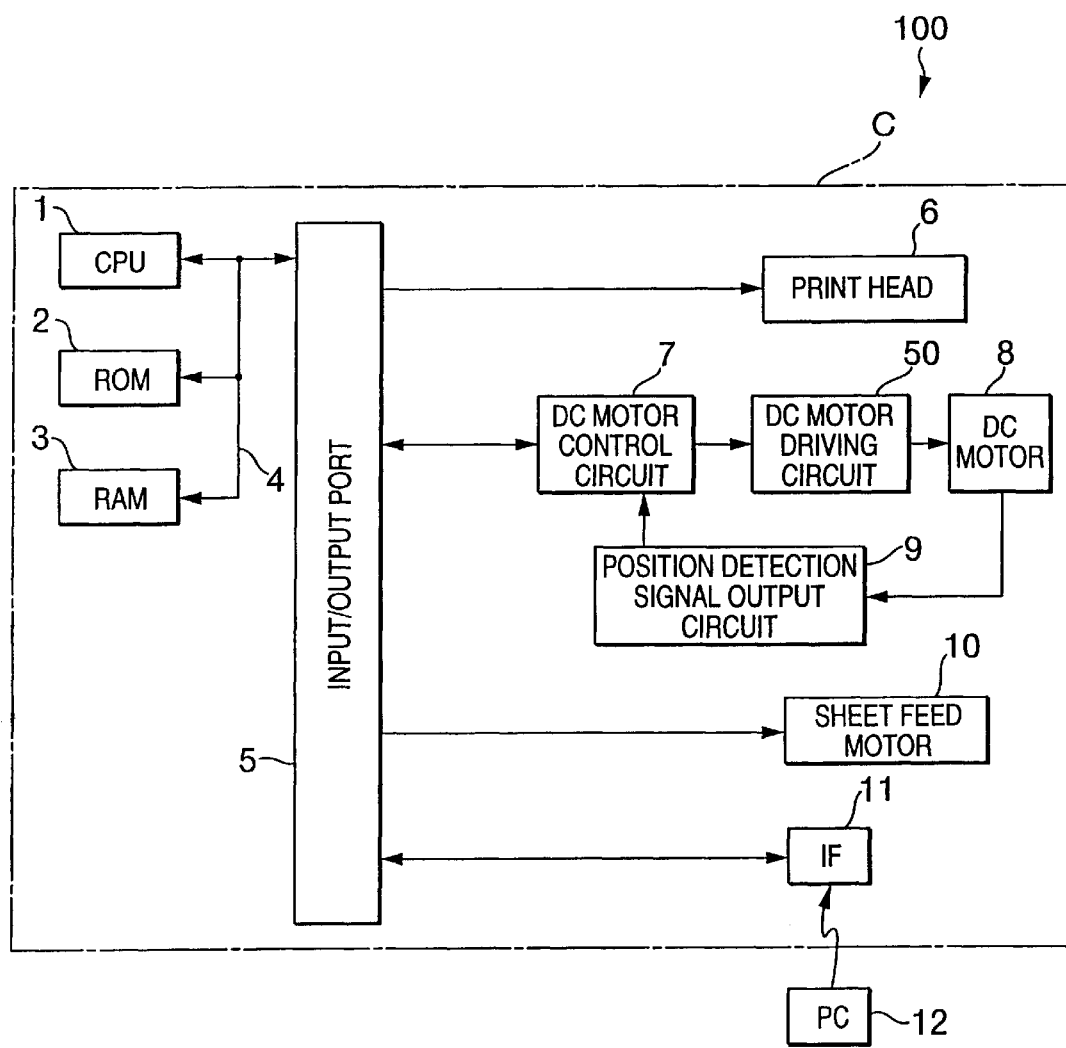
FIG. 6 is a block diagram showing electrical configuration of the serial printing type ink jet printer of FIG. 3A.

As shown in FIGS. 5 and 6, the timing slit strip 68 has alternating transmissive sections (slits) 680 and non-transmissive sections 681 of equal width. The transmissive sections (slits) 680 and the non-transmissive sections 681 are arranged alternately along the main scanning direction X. One transmissive section 680 and one non-transmissive section 681 make up one pitch of the time slit strip 68 in the main scanning direction X. As also shown in FIG. 5, the four light detectors 92a–92d are arranged parallel to the timing slit strip 68. The total length of all the light detectors 92a–92d in the main scanning direction X is equal to the sum of one transmissive section 680 and one non-transmissive section 681, and therefore corresponds to one pitch of the timing slit strip 68. Each of the light detectors 92a–92d serves to produce an output signal indicative of the intensity of the received light. That is, the light detectors 92a–92d produce output signals AB', AB, A'B, and A'B', respectively.

FIG. 6 is a block diagram showing electrical configuration of a control portion C in the serial printing type ink jet printer 100.

The control portion C includes: a CPU 1, a ROM 2, and a RAM 3. The CPU 1 serves as a computation device for controlling the entire operation of the printer 100. The ROM 2 stores data and a variety of control programs (software programs) executed by the CPU 1. The RAM 3 is a rewritable memory used as a memory area for storing print data, work data, and the like. The CPU 1, the ROM 2, and the RAM 3 are connected to one another by a bus line 4. The bus line 4 is connected to an input/output port 5.

Figure 7:
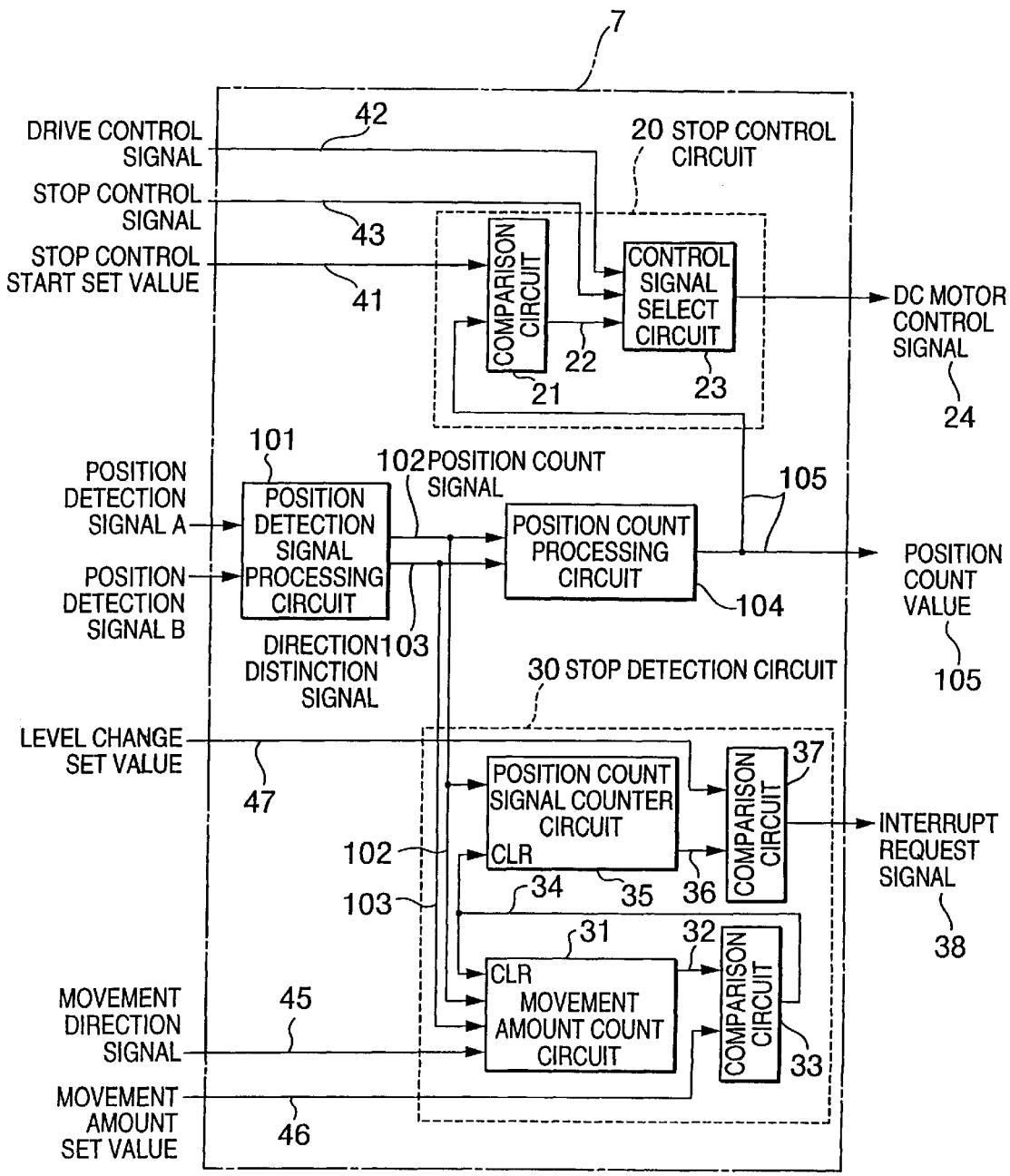
FIG. 7 is a block diagram showing detail configuration of the DC motor control circuit in FIG. 6.

The input/output port 5 is connected to: the print head 6, a DC motor control circuit 7, a sheet feed motor 10, and an interface 11. The interface 11 is connected to a personal computer 12, which serves as a host computer. The sheet feed motor (DC motor) 10 is for driving the platen 72 (FIG. 3A) and the sheet feed rollers 70 (FIG. 3B) to transport the print sheet P in the auxiliary scanning direction Y. The print head 6 is controlled to selectively eject ink by the CPU 1 that executes a predetermined printing program stored in the ROM 2. For example, the CPU 1 executes editing operation of print data supplied from the host computer 12, and determines print timings by executing the predetermined printing program. The DC (direct current) motor 8 serves as the carriage motor to drive the reciprocal movement of the print head 6 (carriage 62) in the main scanning direction X. A DC motor driving circuit 50 is provided for driving the DC motor 8, and is connected to the DC motor control circuit 7. The DC motor control circuit 7 is constructed as a hardware circuit as shown in FIG. 7, and is provided for supplementing or assisting control of the CPU 1 onto the DC motor 8 (DC motor driving circuit 50) as described later.

Figure 2:
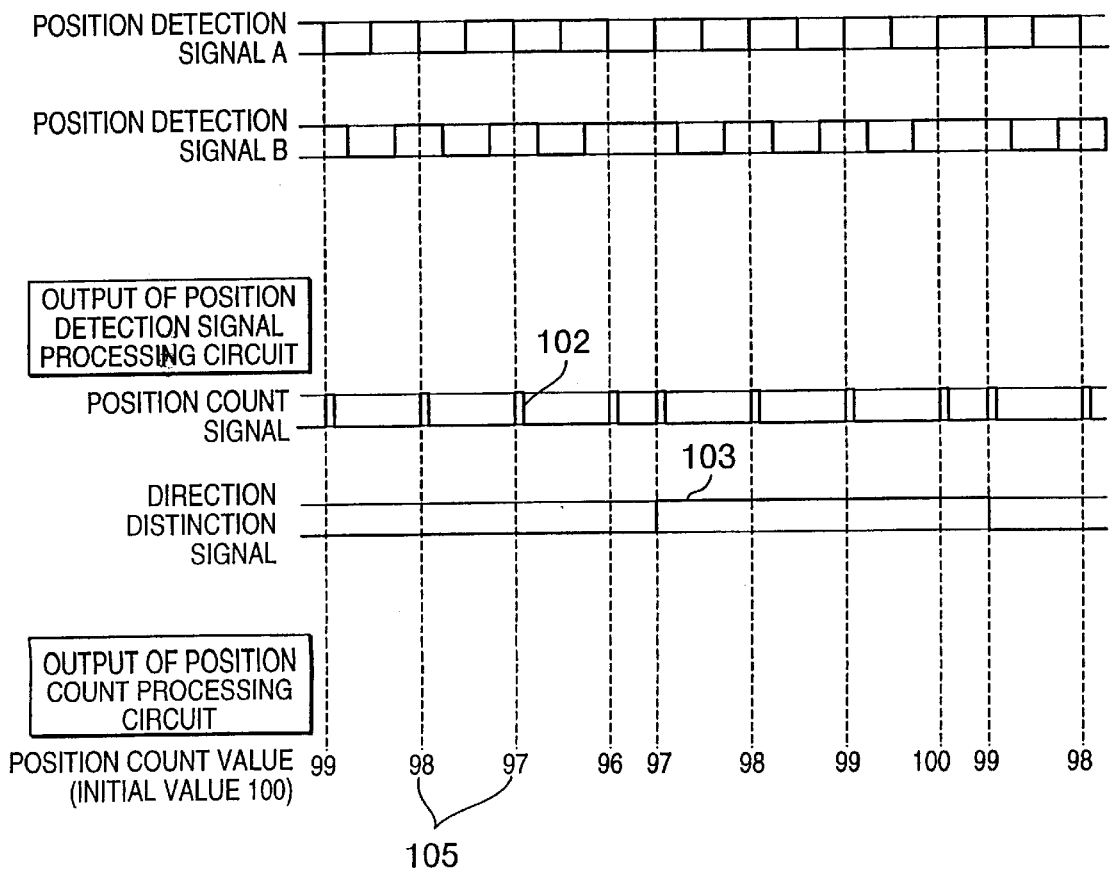
FIG. 2 illustrates signal waveforms outputted from the conceivable DC motor control circuit of FIG. 1.

A position detection signal output circuit 9 is connected to the DC motor control circuit 7. As shown in FIG. 5, the position detection signal output circuit 9 is comprised from: the linear encoder sensor 90 that outputs four output signals AB', AB, A'B, and A'B' as described above, and an encoder signal processing circuit 80 for outputting two position detection signals A and B (FIG. 2). As described already, the linear encoder sensor 90 includes the four light detectors 92a–92d that respectively produce output signals AB', AB, A'B, and A'B'. The encoder signal processing circuit 80 is comprised from first and second processing circuits 81 and 85 for outputting the two position detection signals A and B, respectively. The first processing circuit 81 includes: an adder 82 for adding the output signals AB' and AB to produce a resultant signal 2A; the other adder 83 for adding the output signals A'B and A'B' to produce a resultant signal 2A'; and a comparator 84 for comparing the signal 2A with the signal 2A' and for outputting the position detection signal A based on the compared result. That is, the comparator 84 outputs the position detection signal A of a high level when the signal 2A has an amount greater than the signal 2A' and outputs the position detection signal A of a low level when the signal 2A has an amount smaller than or equal to the signal 2A'. Similarly, the second processing circuit 85 includes: an adder 86 for adding the output signals A'B and AB to produce a resultant signal 2B; the other adder 87 for adding the output signals A'B' and AB' to produce a resultant signal 2B'; and a comparator 88 for comparing the signal 2B with the signal 2B' and for outputting the position detection signal B based on the compared result. That is, the comparator 88 outputs the position detection signal B of a high level when the signal 2B has an amount greater than the signal 2B' and outputs the position detection signal B of a low level when the signal 2B has an amount smaller than or equal to the signal 2B'. With this structure, the position detection signal output circuit 9 can output the position detection signals A and B as shown in FIG. 2. The position detection signals A and B indicate the movement of the carriage 62, thereby indicating the rotation of the DC motor 8. Details of the structure and operation of the position detection signal output circuit 9 are shown, for example, in U.S. Pat. No. 4,691,101, the disclosure of which is hereby incorporated by reference.

The position detection signal output circuit 9 supplies the thus produced position detection signals A and B to the DC motor control circuit 7. The DC motor control circuit 7 supplements or assists control of the CPU 1 onto the DC motor 8, based on the position detection signals A and B.

More specifically, the CPU 1 determines the direction, in which the print head is desired to be moved, and also determines the speed, at which the print head is desired to be moved. The CPU 1 also performs control of printing operation of the print head 6.

The DC motor control circuit 7 receives the position detection signals A and B from the position detection signal output circuit 9, and determines the direction in which the print head is actually moving. The DC motor control circuit 7 then increments or decrements its internal counter based on the determined direction, thereby producing a position count value 105 indicative of the present position of the print head 6.

The DC motor control circuit 7 also judges whether or not the print head reaches one of a pair of predetermined stop positions (described later). When the DC motor control circuit 7 determines that the print head reaches one of the predetermined stop positions, the DC motor control circuit 7 performs a stop control operation onto the control circuit 50 to immediately stop the print head 6 at the predetermined stop position without relying on the CPU 1. It is noted that after the print head 6 stops at the predetermined stop position, the CPU 1 controls the DC motor control circuit 7 to start driving the DC motor 8, in the opposite direction, so that the print head 6 will move in the opposite direction.

The DC motor control circuit 7 further judges whether or not the print head 6 has stopped for some trouble by investigating the state how the position information of the print head 6 changes. When the DC motor control circuit 7 determines that the print head has stopped for some trouble, the DC motor control circuit 7 issues an interrupt request signal 38 so that the CPU 1 will perform a predetermined error process.

The DC motor control circuit 7 also measures the period of time between successively-received position detection signals A. The thus measured period of time represents a speed, at which the print head 6 is moving. The DC motor control circuit 7 compares the measured speed with the desired speed to be attained. The DC motor control circuit 7 then calculates the difference between the actual speed and the desired speed, and determines a period of time, during which the motor 8 should be driven. The DC motor control circuit 7 then performs a PWM (pulse width modulation) control to change the driving time period of the motor 8, thereby controlling the amount of an electric current flowing through the DC motor 8 so that the print head 6 will move stably at the desired speed.

Next, the DC motor control circuit 7 will be described in greater detail with reference to FIG. 7.

As shown in FIG. 7, the DC motor control circuit 7 includes: the position detection signal processing circuit 101; the position count processing circuit 104; a stop control circuit 20; and a stop detection circuit 30. As described already, the position detection signal processing circuit 101 and the position count processing circuit 104 are constructed from hardware circuits and have the same configurations as those shown in FIG. 1. The position detection signal processing circuit 101 therefore serves to receive position detection signals A and B from the position detection signal output circuit 9, and to generate a position count signal 102 and a direction distinction signal 103 at a timing as shown in FIG. 2. The position count processing circuit 104 generates a position count value 105 based on the position count signal 102 and the direction distinction signal 103 at a timing as also shown in FIG. 2.

Next, the stop control circuit 20 will be described below in greater detail.

As shown in FIG. 7, the stop control circuit 20 is configured from a hardware circuit, and is for performing stop control of the DC motor 8 when the DC motor 8 is being driven. When the moving print head 6 reaches either one of the pair of predetermined stop positions, the stop control circuit 20 directly controls the DC motor 8 to stop without relying on the CPU 1. For this reason, movement of the print head 6 can be stopped regardless of the operation condition of the CPU 1. Therefore, the print head 6 can be controlled to stop at uniform timings so that the print head 6 can be stopped at the predetermined positions stably.

More specifically, as shown in FIG. 7, the stop control circuit 20 includes: a comparison circuit 21 and a control signal select circuit 23. The comparison circuit 21 is for receiving: the position count value 105 outputted from the position count processing circuit 104; and a predetermined stop control start set value 41 that is outputted from the CPU 1 over the input/output port 5. The comparison circuit 21 is for comparing the position count value 105 with the stop control start set value 41. When the comparison circuit 21 detects that the position count value 105 matches the stop control set value 41, the comparison circuit 21 outputs a matching signal 22 to the control signal select circuit 23.

The stop control start set value 41 will be described below in greater detail while referring to FIG. 8.

Figure 8:
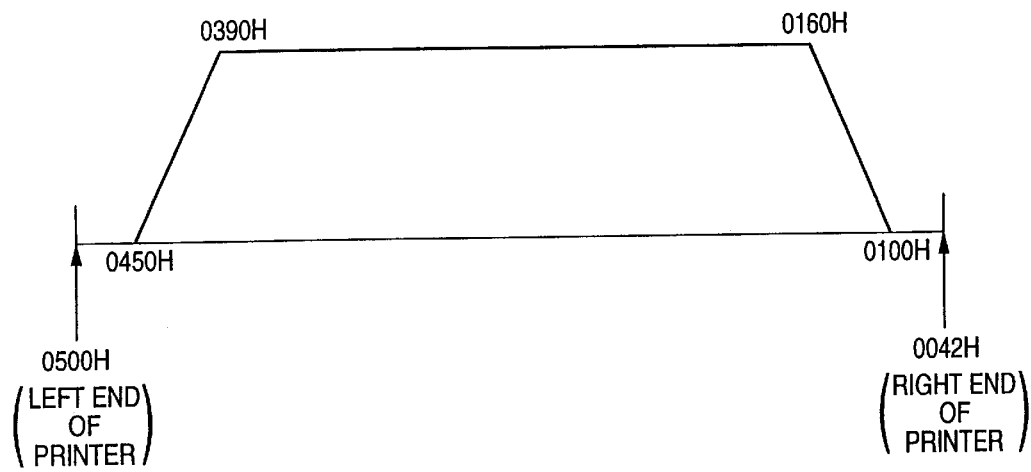
FIG. 8 is a timing chart showing the relationship between a position of the print head and the movement speed of the print head.

FIG. 8 is a timing chart showing the relationship between a position of the print head 6 in the ink jet printer 100 and the movement speed of the print head 6. The horizontal axis represents a movement position of the print head 6, wherein the left end of the printer 100 is represented by the value of "500 H" and the right end of the printer 100 is represented by the value of "42 H". The print head 6 has to travel between positions indicated by the values of "450 H" and "100 H" with some leeway at an either end of the printer 100. The vertical axis represents movement speed of the print head 6.

As shown in FIG. 8, in order to drive the print head 6 to travel from left to right, the DC motor 8 starts driving movement of the print head 6 when the print head 6 is positioned at "450 H". When the print head 6 reaches a position indicated by the value of "160 H", drive of the DC motor 8 is stopped. When the drive of the DC motor 8 is thus stopped at the position "160 H", the print head 6 will continue moving from the position "160 H, " and will finally stop at the position indicated by the value of "100 H". For this reason, when the print head 6 moves from left to right, the CPU 1 outputs the value of "160 H" as the stop control start set value 41 to the comparison circuit 21.

On the other hand, in order to drive the print head 6 to travel from right to left, drive of the DC motor 8 starts when the print head 6 is at the position indicated by "100 H". When the print head 6 reaches a position indicated by the value of "390 H", drive of the DC motor 8 is stopped. When drive of the DC motor 8 is thus stopped at the position "390

H", the print head 6 will continue moving from the position "390 H" to finally stop at the position of "450 H". For this reason, when the print head 6 is driven to move from right to left, the CPU 1 outputs the value of "390 H" as the stop control start set value 41 to the comparison circuit 21.

The control signal select circuit 23 is for receiving: the matching signal 22 supplied from the comparison circuit 21, and a drive control signal 42 and a stop control signal 43 both of which are supplied from the CPU 1 via the input/output port 5. The drive control signal 42 is for driving the DC motor 8. It is noted that as will be described later, either one of a forward rotation signal 42a and a reverse rotation signal 42b is supplied from the CPU 1 as the drive control signal 42. The stop control signal 43 is a brake signal for stopping the DC motor 8. The control signal select circuit 23 selects one of the drive control signal 42 and the stop control signal 43 and outputs the selected signal as a DC motor control signal 24 to the DC motor driving circuit 50. The DC motor 8 is driven by the DC motor driving circuit 50 according to the DC motor control signal 24.

The control signal select circuit 23 performs the selection operation in a manner described below.

While the control signal select circuit 23 is outputting the drive control signal 42 as the DC motor control signal 24, when the control signal select circuit 23 receives the matching signal 22 from the comparison circuit 21, then the control signal select circuit 23 replaces the drive control signal 42 with the stop control signal 43. The control signal select circuit 23 outputs the stop control signal 43 as the DC motor control signal 24 to the DC motor driving circuit 50 to stop the DC motor 8. It is noted that as will be described later, when switching the DC motor control signal 24 from the drive control signal 42 to the stop control signal 43, the control signal select circuit 23 outputs a switching-time output signal 44 for a fixed duration of time before outputting the stop control signal 43.

The DC motor control signal 24 will be described below in greater detail while referring to FIGS. 9 and 10.

Figure 9:
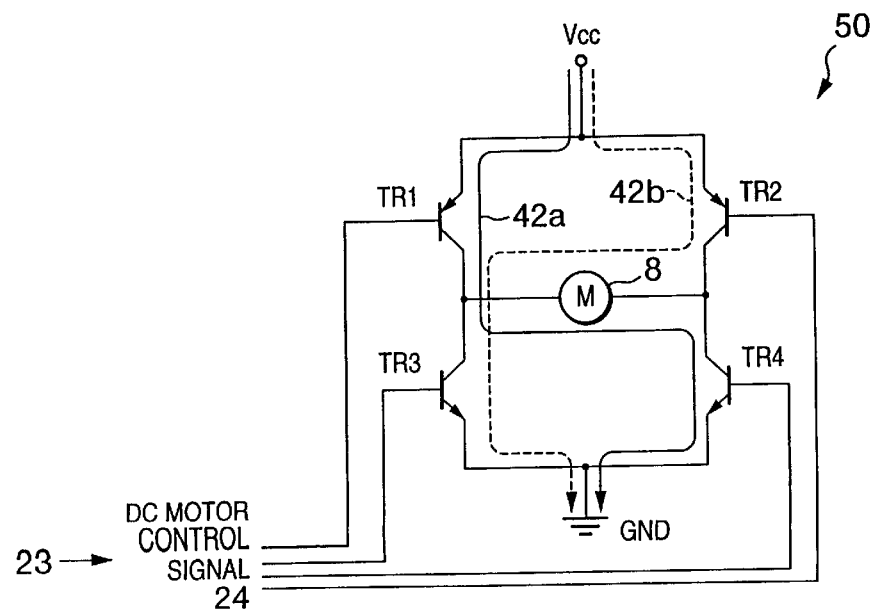
FIG. 9 is a circuit diagram schematically showing configuration of the DC motor and a drive circuit for driving the DC motor.

As shown in FIG. 9, the drive circuit 50 for driving the DC motor 8 is configured from: a power source supplying a fixed electric voltage Vcc; and four transistors TR1 to TR4 that are connected in an H-shaped-bridge configuration.

As shown in FIG. 10, the DC motor control signal 24 is switched among four signal states of: the forward rotation signal (drive control signal) 42a; the reverse rotation signal 42b (drive control signal); the brake signal (stop control signal) 43; and the switching-time output signal 44. ON and OFF conditions of the switches (transistors) TR1 to TR4 are controlled by the four signal states of the DC motor control signal 24 as shown in FIG. 10.

That is, the forward rotation signal 42a serves to turn ON the transistors TR1 and TR4, and to turn OFF the transistors TR2 and TR3. When the forward rotation signal 42a is supplied to the drive circuit 50 as the DC motor control signal 24, the DC motor 8 rotates in a forward direction, whereby the print head 6 travels in the forward direction, that is, from left to right (FIG. 3B).

The reverse rotation signal 42b serves to turn OFF the transistors TR1 and TR4, and to turn ON the transistors TR2 and TR3. When the reverse rotation signal 42b is supplied to the drive circuit 50 as the DC motor control signal 24, the DC motor 8 rotates in a reverse direction, whereby the print head 6 travels in the reverse direction, that is, from right to left (FIG. 3B).

The brake signal (stop control signal) 43 is for quickly stopping the DC motor 8 while the DC motor 8 is being driven. The brake signal (stop control signal) 43 turns OFF the transistors TR1 and TR2 and turns ON the transistors TR3 and TR4. It is noted that the break signal 43 can be modified to turn ON the transistors TR1 and TR2 and to turn OFF the transistors TR3 and TR4.

As described already, when switching the DC motor control signal 24 from the drive control signal 42 (42a or 42b) to the stop control signal 43, the control signal select circuit 23 outputs the switching-time output signal 44 for the predetermined duration of time as the DC motor control signal 24. The switching-time output signal 44 turns OFF all of the transistors TR1 to TR4. The switching-time output signal 44 can prevent the power source Vcc from being short-circuited to the ground when the DC motor control signal 24 is switched from the drive control signal 42 (42a or 42b) to the stop control signal 43. The drive circuit 50 can therefore be properly protected.

Next, the stop detection circuit 30 will be described below in greater detail.

The stop detection circuit 30 is constructed also from a hardware circuit. The stop detection circuit 30 is for detecting whether the print head 6 stops for some trouble. More specifically, the stop detection circuit 30 detects when the print head 6 makes an unscheduled stop and notifies the CPU 1 accordingly by outputting an interrupt request signal 38. Upon receiving the interrupt request signal 38, the CPU 1 executes the predetermined error processes for coping with such a situation. This allows the CPU 1 to execute the predetermined processes only when it receives notification from the stop detection circuit 30. Therefore, the CPU 1 need not constantly check whether the print head 6 has made an unscheduled stop. Processing burden on the CPU 1 is greatly reduced, and therefore processing capability of the CPU 1 is greatly enhanced.

As shown in FIG. 7, the stop detection circuit 30 includes: a movement amount count circuit 31, two comparison circuits 33 and 37; and a position count signal counter circuit 35.

The movement amount count circuit 31 is for counting an actual movement amount, by which the print head 6 actually moves. The movement amount count circuit 31 is inputted with the position count signal 102 and the direction distinction signal 103 from the position detection signal processing circuit 101. The movement amount count circuit 31 is inputted also with a movement direction signal 45 that is issued from the CPU 1 via the input/output port 5. The movement direction signal 45 indicates a direction, in which the CPU 1 is controlling the print head 6 to move. In other words, the movement direction signal 45 represents a movement direction, in which the print head 6 is desired by the CPU 1 to move. On the other hand, the direction distinction signal 103 indicates a movement direction, in which the print head 6 actually moves.

The movement amount count circuit 31 is for counting its internal counter 32 each time it receives a position count signal 102. The movement amount count circuit 31 outputs the counted internal counter value 32 to the comparison circuit 33. More specifically, the movement amount count circuit 31 increments its internal counter value 32 by one each time it receives a position count signal 102 when the movement direction signal 45 and the direction distinction signal 103 indicate the same direction. On the other hand, when the movement direction signal 45 and the direction distinction signal 103 indicate opposite directions, the movement amount count circuit 31 decrements its internal counter value 32 by one each time it receives a position count signal 102. Thus, as long as the signals 45 and 103 indicate the same direction, the internal counter value 32 will increase. However, when the signals 45 and 103 indicate the opposite directions, the internal counter value 32 will decrease. With this configuration, the movement amount count circuit 31 can count the amount that the print head 6 actually moves in the direction scheduled by the CPU 1. It is noted that when the print head 6 moves in a direction opposite to the direction scheduled by the CPU 1, the internal counter value 32 will fall to a negative value.

The comparison circuit 33 is for comparing the internal counter value 32 with a predetermined movement amount set value 46 that is outputted from the CPU 1. In the present embodiment, the movement amount set value 46 is set to a fixed value of "5 H". When the internal counter value 32 reaches "5 H", then the comparison circuit 33 outputs a clear signal 34 to both of the movement amount count circuit 31 and the position count signal counter circuit 35. As a result, the internal counter value in the movement amount count circuit 31 is cleared to zero (0), and an internal counter value 36 (described later) in the position count signal counter circuit 35 is also cleared to zero (0).

The position count signal counter circuit 35 is for counting an amount that the print head 6 is controlled to move. The position count signal counter circuit 35 receives the position count signal 102 from the position detection signal processing circuit 101. The position count signal counter circuit 35 increments its internal counter value 36 by one each time it receives the position count signal 102 regardless of the movement direction of the print head 6. The position count signal counter circuit 35 outputs the counted internal counter value 36 to the comparison circuit 37.

It is now assumed that the carriage 62 stops moving for some trouble. In this case, the carriage 62 oscillates in the main scanning direction X substantially at the same position in association with the rotation of the DC motor 8. Because the movement amount count circuit 31 takes into account the direction in which the carriage 62 actually moves, when the carriage 62 thus oscillates substantially at the same position, the movement amount count circuit 31 repeatedly increments and decrements the counter value (actual movement amount) 32, whereby the counter value 32 will not increase. Contrarily, because the position count signal counter circuit 35 does not take into account the direction in which the carriage 62 moves, when the carriage 62 stops moving for some trouble and oscillates substantially at the same position in association with the rotation of the DC motor 8, the position count signal counter circuit 35 will simply increment the counter value (controlled movement amount) 36 repeatedly in accordance with the rotation of the DC motor 8.

For example, if the carriage 62 oscillates ten times at the same position, the counter value (controlled movement amount) 36 of the position count signal counter circuit 35 reaches ten (10), but the counter value (actual movement amount) 32 of the movement amount count circuit 31 is still zero (0).

The comparison circuit 37 is for receiving: the internal counter value 36 supplied from the position count signal counter circuit 35; and a predetermined level change set value 47 that is outputted from the CPU 1. According to the present embodiment, the level change set value 47 is set to a fixed value of "20 H" that is greater than the movement amount set value "5 H". The comparison circuit 37 compares the internal counter value 36 with the level change set value 47. When the internal counter value 36 reaches the value 47 of "20H", then the comparison circuit 37 outputs an interrupt request signal 38 to the CPU 1 via the input/output port 5.

Thus, when the controlled movement amount 36 becomes greater than the actual movement amount 32 by the predetermined amount, the interrupt request is issued to the CPU 1. Upon receipt of the interrupt request signal 38, the CPU 1 will perform corresponding interrupt processes (error processes).

It is noted that although not shown in the drawings, the DC motor control circuit 7 further includes a speed detection circuit and a speed control circuit. The speed detection circuit is a hardware circuit for measuring the period of time between successively-received position detection signals A. The thus measured period of time represents a speed, at which the print head 6 is moving. The speed control circuit is a hardware circuit for calculating the difference between the thus detected actual speed and the desired speed to be attained, and for determining a period of time, during which the motor 8 should be driven. The speed control circuit then performs a PWM control on the drive control signal 42, that is outputted from the stop control circuit 20 to be supplied to the DC motor driving circuit 50, thereby controlling the amount of an electric current flowing through the DC motor 8 so that the print head 6 will move stably at the desired speed.

With the above-described structure, the DC motor control circuit 7 operates as described below.

First, operations of the stop control circuit 20 will be described.

When the DC motor 8 rotates, the position detection signal output circuit 9 detects movement of the carriage 62, that is, rotation of the DC motor 8, and outputs two position detection signals A and B to the position detection signal processing circuit 101. The position detection signal processing circuit 101 converts the two position detection signals A and B into the position count signal 102 and the direction distinction signal 103, and outputs these signals 102 and 103 to the position count processing circuit 104. Based on the signals 102 and 103, the position count processing circuit 104 calculates the position count value 105 indicative of the movement position of the print head 6. The position count processing circuit 104 outputs the position count value 105 to the comparison circuit 21.

The comparison circuit 21 compares the position count value 105 with the stop control start set value 41. When the position count value 105 matches the stop control start set value 41, then the comparison circuit 21 outputs the matching signal 22 to the control signal select circuit 23. Upon receipt of the matching signal 22, the control signal select circuit 23 switches output of the DC motor control signal 24 from the drive control signal 42 (forward rotation signal 42a or reverse rotation signal 42b), that is presenting outputting, to the stop control signal (break signal) 43. It is noted that before outputting the stop control signal 43, the control signal select circuit 23 temporarily outputs the switching-time output signal 44 to turn OFF all the transistors TR1 to TR4 in the motor driving circuit 50.

Because the stop control circuit 20 is configured from the hardware circuit that operates independently from the CPU 1, control operations for stopping the DC motor 8 can be started at a timing when the comparison circuit 21 outputs the matching signal 22, regardless of the processing situation of the CPU 1. Accordingly, the processes for stopping the DC motor 8 can be performed at a stable timing so that the print head 6 can be stopped stably at the desired fixed positions ("0450H" and "0100H").

It is noted that after the print head 6 thus stops at the predetermined stop position ("0450H" and "0100H"), the CPU 1 controls the control signal select circuit 23 to select outputting the drive control signal 42 (forward rotation signal 42a or reverse rotation signal 42b) in order to drive the DC motor 8 in a direction opposite to the direction, in which the DC motor 8 has been rotated before being stopped. Accordingly, the print head 6 will move in the opposite direction. It is noted that the CPU 1 controls the control signal select circuit 23 to output the switching-time output signal 44 before starting outputting the drive control signal 42.

It is also noted that while the control signal select circuit 23 outputs the drive control signal 42 (forward rotation signal 42a or reverse rotation signal 42b), the drive control signal 42 is PWM controlled by the sped control circuit (not shown), thereby changing the amount of the electric current flowing through the DC motor 8 so that the print head 6 will move stably at the desired speed. The CPU 1 controls printing operation of the print head 6.

Next, operations of the stop detection circuit 30 will be described.

As described above, when the DC motor 8 rotates, the position detection signal output circuit 9 detects the rotation of the DC motor 8 (the movement of the carriage 62), and outputs two position detection signals A and B to the position detection signal processing circuit 101. The position detection signal processing circuit 101 converts the position detection signals A and B into the position count signal 102 and the direction distinction signal 103. The position detection signal processing circuit 101 outputs both signals 102 and 103 to the movement amount count circuit 31. The position detection signal processing circuit 101 outputs only the position count signal 102 to the position count signal counter circuit 35.

While the direction distinction signal 103 indicates the same direction with the movement direction signal 45, then the movement amount count circuit 31 increments its internal counter value 32 by one each time it receives the position count signal 102. On the other hand, when the signal 103 indicates a direction different from that indicated by the movement direction signal 45, then the movement amount count circuit 31 decrements its internal counter value 32 by one each time it receives the position count signal 102. The incremented or decremented counter value 32 is outputted to the comparison circuit 33. The comparison circuit 33 compares the internal counter value 32 with the movement amount set value 46. Then the internal counter value 32 reaches the movement amount set value 46 of "5H", then the comparison circuit 33 outputs the clear signal 34 to clear the internal counter values in both the movement amount count circuit 31 and the position count signal counter circuit 35 to zero (0).

Each time the position count signal counter circuit 35 receives input of the position count signal 102, the position count signal counter circuit 35 increments its internal counter value 36 by one and outputs the resultant counter value 36 to the comparison circuit 37. The comparison circuit 37 compares the internal counter value 36 with the level change set value 47. When the internal counter value 36 reaches the level change set value 47 of "20H", then the comparison circuit 37 outputs an interrupt request signal 38 to the CPU 1, whereupon the CPU 1 executes the predetermined interrupt routine (error process).

Thus, the stop detection circuit 30 detects that the print head 6 has stopped moving for some trouble, when the internal counter value 36 in the position count signal counter circuit 35 has exceeded "20H" even though the internal counter value 32 in the movement amount count circuit 31 is still less than "5H". In other words, the stop detection circuit 30 detects that the DC motor control circuit 7 has stopped moving for some trouble, when an amount that the print head 6 has been controlled to move exceeds "20" but the actual amount that the print head 6 has moved is still less than "5H".

When the stop detection circuit 30 makes this determination, the stop detection circuit 30 notifies the CPU 1 of the abnormal situation by outputting the interrupt request signal 38. Because the stop detection circuit 30 is a hardware circuit that operates independently from the CPU 1, the CPU 1 need perform the predetermined routine only upon receiving the notification from the stop detection circuit 30. Therefore, burden on the CPU 1 is greatly reduced compared to a situation when the CPU 1 has to constantly check whether the print head 6 has abnormally stopped or not. As a result, the processing capability of the CPU 1 is enhanced.

As described above, according to the present embodiment, the stop control circuit 20 is configured from the hardware circuit that operates independently from the CPU 1. When the comparison circuit 21 outputs a matching signal 22, then the stop control circuit 20 starts processes for stopping the DC motor 8, regardless of the processing condition of the CPU 1. Accordingly, operations for stopping the DC motor 8 can be executed at a stable timing so that the DC motor 8 can be stopped at fixed positions. The stop detection circuit 30 detects whether the print head 6 has made an unscheduled stop for some reason or the other, and outputs an interrupt request signal 38 to the CPU 1, when an amount that the print head 6 is controlled to move has exceeded 20H even though the actual amount that the print head has moved is still less than 5H. Accordingly, the CPU 1 need perform predetermined processes for the unscheduled stops only upon receiving the interrupt request 38 from the stop detection circuit 30. Therefore, there is no need for the CPU 1 to constantly check whether or not the print head has made an abnormal stop. Accordingly, burden on the CPU 1 is greatly reduced so that the processing capability of the CPU 1 is enhanced.

While the invention has been described in detail with reference to the specific embodiment thereof, it would be apparent to those skilled in the art that various changes and modifications may be made therein without departing from the spirit of the invention, the scope of which is defined by the attached claims.

For example, in the above-described embodiment, the linear scale 68 is employed, and the linear encoder sensor 90 is used. However, a circular scale may be provided to the DC motor 8, and a rotary encoder sensor may be provided to detect the circular scale, thereby directly detecting the rotation of the DC motor 8.

In the above-described embodiment, the DC motor control circuit 7 is provided for controlling the DC motor 8 to drive the print head 6, for a reciprocal movement, relative to the sheet of paper. However, a DC motor control circuit can be provided for controlling the sheet feed motor 10 (DC motor) to drive the sheet feed mechanism (sheet feed rollers 70 and the platen 72) to convey the recording sheet relative to the print head 6. In this case, the position detection signal processing circuit 101 may receive outputs from a rotary encoder that is provided to the sheet feed motor 10.

The above-described embodiment is directed to the serial type ink jet print head. However, the present invention can be applied to other various control devices that supplement or assist control operations of a CPU in the control device.

What is claimed is:

1. A DC motor control circuit for controlling a DC motor, comprising:

a rotational signal output circuit detecting a rotation of a DC motor, that is controlled by a control unit to attain a relative movement between a print head and a recording medium, and outputting a rotation signal indicative of the detected rotation;

an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium;

a position output circuit receiving the operational signal and outputting a positional value indicative of the relative position between the print head and the recording medium;

a comparing circuit comparing the positional value with a first predetermined value, and outputting a matching signal when the positional value is matched with a first predetermined value;

a switch circuit receiving the matching signal, and switching from outputting of a drive signal for driving the DC motor to outputting of a stop signal for stopping the DC motor;

a controlled movement amount count circuit counting a movement amount value, controlled to be attained onto the relative movement, based on the movement amount signal;

an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal;

a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

2. A DC motor control circuit, comprising:

a rotational signal output circuit detecting a rotation of a DC motor, that is controlled by a control unit to attain a relative movement between a print head and a recording medium, and outputting a rotation signal indicative of the detected rotation;

an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium;

a controlled movement amount count circuit counting a movement amount value, controlled to be attained onto the relative movement, based on the movement amount signal;

an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls the attain the relative movement, and by decrementing the actual movement amount based on the movement amount signal when the movement direction signal indicates the opposite direction from the controlled direction signal;

a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is topped, when the value counted by the controlled movement amount count circuit reaches a third predetermined value that is greater than the second predetermined value.

3. A DC motor control circuit as claimed in claim 2, further comprising:

a position output circuit receiving the operational signal and outputting a positional value indicative of the relative position between the print head and the recording medium;

a comparing circuit comparing the positional value with a first predetermined value, and outputting a matching signal when the positional value is matched with a first predetermined value; and a switch circuit receiving the matching signal, and switching from outputting of a drive signal for driving the DC motor to outputting of a stop signal for stopping the DC motor.

4. A DC motor control circuit as claimed in claim 3, further comprising at least one switch driving the DC motor, wherein the switch circuit outputs a signal to turn OFF all of the at least one switch before switching from the DC motor driving signal to the DC motor stopping signal.

5. A DC motor control device for controlling a DC motor, comprising:

a control unit controlling rotation of a DC motor to attain a relative movement between a print head and a recording medium;

a rotational signal output circuit detecting the rotation of the DC motor, that is controlled by the control unit to attain the relative movement, and outputting a rotation signal indicative of the detected rotation;

an operation signal output circuit receiving the rotation signal and outputting an operational signal, the operational signal including a movement direction signal indicative of a direction, in which the relative movement is attained between the print head and the recording medium, and a movement amount signal indicative of an amount of the relative movement between the print head and the recording medium;

a position output circuit receiving the operational signal and outputting a positional value indicative of the relative position between the print head and the recording medium;

a comparing circuit comparing the positional value with a first predetermined value, and outputting a matching signal when the positional value is matched with a first predetermined value;

a switch circuit receiving the matching signal, and switching from outputting of a drive signal for driving the DC motor to outputting of a stop signal for stopping the DC motor;

a controlled movement amount count circuit counting a movement amount value, controlled to be attained onto the relative movement, based on the movement amount signal;

an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal;

a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

6. A printer, comprising:

a print head performing a printing operation onto a recording medium;

a DC motor rotating to attain a relative movement between the print head and the recording medium;

a control unit controlling the rotation of the DC motor;

a rotational signal output circuit detecting the rotation of the DC motor, and outputting a rotation signal indicative of the detected rotation;

an operation signal output circuit receiving the rotation signal and outputting an operational signal, the operation signal including a movement direction signal indicative of a direction, in which the relative movement is attained between the print head and the recording medium, and a movement amount signal indicative of an amount of the relative movement between the print head and the recording medium;

a controlled movement amount count circuit counting a movement amount value, controlled to be attained onto the relative movement, based on the movement amount signal;

an actual movement amount count circuit counting an actual movement amount, by which the relative movement is actually performed, based on the movement amount signal, by incrementing the actual movement amount based on the movement amount signal when the movement direction signal indicates the same direction with a controlled direction signal that is issued from the control unit and that is indicative of the direction in which the control unit controls to attain the relative movement, and by decrementing the actual movement amount based on the movement amount signal when the movement direction signal indicates the opposite direction from the controlled direction signal;

a reset circuit resetting the value counted by the controlled movement amount count circuit and the value counted by the actual movement amount count circuit when the value counted by the actual movement amount count circuit reaches a second predetermined value; and a stopped condition signal output circuit outputting, to the control unit, a signal indicating that the relative movement is stopped, when the value counted by the controlled movement amount count circuit reaches a third predetermined value that is greater than the second predetermined value.

7. A DC motor control circuit, comprising:

a rotational signal output circuit detecting a rotation of a DC motor, and outputting a rotation signal indicative of the detected rotation;

an operation signal output circuit receiving the rotation signal and outputting an operation signal, the operational signal including a movement direction signal indicative of a direction, in which the relative movement is attained between the print head and the recording medium, and a movement amount signal indicative of an amount of the relative movement between the print head and the recording medium;

a first movement amount count circuit counting a first movement amount value of the relative movement by simply incrementing the first movement amount value based on the movement amount signal;

a second movement amount count circuit counting a second movement amount of the relative movement based on both of the movement amount signal and the movement direction signal;

a rest circuit resetting the value counted by the first movement amount count circuit and the value counted by the second movement amount count circuit when the value counted by the second movement amount count circuit reaches a second predetermined value; and a stopped condition signal output circuit outputting a signal indicating that the relative movement is stopped, when the value counted by the first movement amount count circuit reaches a third predetermined value that is greater than the second predetermined value.

* * * * *